(12) United States Patent
Lindner et al.

(10) Patent No.: US 7,763,202 B2
(45) Date of Patent: Jul. 27, 2010

(54) METHOD OF SURFACE TREATING PARTICULATE MATERIAL USING ELECTROMAGNETIC RADIATION

(75) Inventors: Torsten Lindner, Kronberg (DE); Aleksey Mikhailovich Pinyayev, West Chester, OH (US); Andrew Julian Wnuk, Wyoming, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 336 days.

(21) Appl. No.: 12/035,625

(22) Filed: Feb. 22, 2008

(65) Prior Publication Data
US 2008/0207792 A1    Aug. 28, 2008

Related U.S. Application Data

(60) Provisional application No. 60/902,659, filed on Feb. 22, 2007.

(51) Int. Cl.
C08J 3/28      (2006.01)
C08J 3/24      (2006.01)
C08J 7/18      (2006.01)

(52) U.S. Cl. .................. 264/447; 264/446; 522/49; 522/46; 522/33; 522/117; 522/121

(58) Field of Classification Search .......... 264/447, 264/446, 425; 522/33, 46, 49, 117, 121
See application file for complete search history.

(56) References Cited

U.S. PATENT DOCUMENTS 3,214,492 A    10/1965    Tocker 3,429,852 A    2/1969    Martin (Continued)

FOREIGN PATENT DOCUMENTS

DE    19 619 680 A    11/1997

(Continued)

OTHER PUBLICATIONS

International Search Report dated Jul. 30, 2008 (4 pages).

(Continued)

*Primary Examiner*—Susan W Berman
(74) *Attorney, Agent, or Firm*—John G. Powell; Amy M. Foust; Charles R. Ware

(57) ABSTRACT

The present disclosure relates to a method of surface treating particulate materials with electromagnetic radiation, in particular a method of cross-linking superabsorbent polymer particles using UV irradiation. The method is carried out with a so-called roll reactor, which comprises a rotating roll and an irradiation source. Radical former molecules can be applied on the surface of superabsorbent polymer particles. The particulate material is fed onto the surface of the roll and is irradiated while moved with the rotating roll. The irradiation source is provided such that the radiation emitted by the irradiation source is able to reach at least part of the particulate material that has been fed onto the surface of the roll. The irradiation source for use in the method of the present disclosure is able to emit UV radiation of a wavelength between 201 nm and 400 nm. The present disclosure also relates to absorbent articles comprising surface treated superabsorbent particles made by said method.

19 Claims, 2 Drawing Sheets

U.S. PATENT DOCUMENTS

| | | | |
|---|---|---|---|
| 3,622,848 A | 11/1971 | Hendrix et al. |
| 3,661,875 A | 5/1972 | Sieja |
| 3,860,003 A | 1/1975 | Buell |
| 3,935,099 A | 1/1976 | Weaver et al. |
| 3,959,569 A | 5/1976 | Burkholder, Jr. et al. |
| 4,043,887 A | 8/1977 | Pacifici et al. |
| 4,062,817 A | 12/1977 | Westerman |
| 4,076,663 A | 2/1978 | Masuda et al. |
| 4,093,776 A | 6/1978 | Aoki et al. |
| 4,124,748 A | 11/1978 | Fujimoto et al. |
| 4,286,082 A | 8/1981 | Tsubakimoto et al. |
| 4,304,895 A | 12/1981 | Loshaek |
| 4,367,323 A | 1/1983 | Kitamura et al. |
| 4,389,513 A | 6/1983 | Miyazaki |
| 4,446,261 A | 5/1984 | Yamasaki et al. |
| 4,514,345 A | 4/1985 | Johnson et al. |
| 4,610,678 A | 9/1986 | Weisman et al. |
| 4,625,001 A | 11/1986 | Tsubakimoto et al. |
| 4,654,039 A | 3/1987 | Brandt et al. |
| 4,666,983 A | 5/1987 | Tsubakimoto et al. |
| 4,683,274 A | 7/1987 | Nakamura et al. |
| 4,690,996 A | 9/1987 | Shih et al. |
| 4,721,647 A | 1/1988 | Nakanishi et al. |
| 4,734,478 A | 3/1988 | Tsubakimoto et al. |
| 4,738,867 A | 4/1988 | Itoh et al. |
| 4,748,076 A | 5/1988 | Saotome |
| 4,769,427 A | 9/1988 | Nowakowsky et al. |
| 4,783,510 A | 11/1988 | Saotome |
| 4,834,735 A | 5/1989 | Alemany et al. |
| 4,847,137 A | 7/1989 | Kellen et al. |
| 4,873,299 A | 10/1989 | Nowakowsky et al. |
| 4,910,250 A | 3/1990 | Saotome |
| 4,922,004 A | 5/1990 | Kohler et al. |
| 4,940,464 A | 7/1990 | Van Gompel et al. |
| 4,950,683 A | 8/1990 | Ward et al. |
| 4,950,692 A | 8/1990 | Lewis et al. |
| 4,973,632 A | 11/1990 | Nagasuna et al. |
| 4,985,518 A | 1/1991 | Alexander et al. |
| 5,124,416 A | 6/1992 | Haruna et al. |
| 5,128,386 A | 7/1992 | Rehmer et al. |
| 5,137,537 A | 8/1992 | Herron et al. |
| 5,145,906 A | 9/1992 | Chambers et al. |
| 5,147,345 A | 9/1992 | Young et al. |
| 5,151,092 A | 9/1992 | Buell et al. |
| 5,164,459 A | 11/1992 | Kimura et al. |
| 5,223,645 A | 6/1993 | Barwich et al. |
| 5,244,735 A | 9/1993 | Kimura et al. |
| 5,244,934 A | 9/1993 | Umeda et al. |
| 5,248,805 A | 9/1993 | Boettcher et al. |
| 5,250,640 A | 10/1993 | Irie et al. |
| 5,260,345 A | 11/1993 | DesMarais et al. |
| 5,264,495 A | 11/1993 | Irie et al. |
| 5,264,533 A | 11/1993 | Rehmer et al. |
| 5,275,773 A | 1/1994 | Irie et al. |
| 5,342,338 A | 8/1994 | Roe |
| 5,380,808 A | 1/1995 | Sumiya et al. |
| 5,387,207 A | 2/1995 | Dyer et al. |
| 5,389,699 A | 2/1995 | Rehmer et al. |
| 5,397,316 A | 3/1995 | LaVon et al. |
| 5,422,405 A | 6/1995 | Dairoku et al. |
| 5,478,879 A | 12/1995 | Kajikawa et al. |
| 5,554,145 A | 9/1996 | Roe et al. |
| 5,562,646 A | 10/1996 | Goldman et al. |
| 5,569,234 A | 10/1996 | Buell et al. |
| 5,597,873 A | 1/1997 | Chambers et al. |
| 5,610,208 A | 3/1997 | Dairoku et al. |
| 5,625,222 A | 4/1997 | Yoneda et al. |
| 5,633,316 A | 5/1997 | Gartner et al. |
| 5,650,222 A | 7/1997 | DesMarais et al. |
| 5,859,084 A | 1/1999 | Schroder et al. |
| 5,883,158 A | 3/1999 | Nambu et al. |
| 5,922,417 A | 7/1999 | Singleton et al. |
| 5,976,696 A | 11/1999 | Collette et al. |
| 6,004,306 A | 12/1999 | Robles et al. |
| 6,007,833 A | 12/1999 | Chudzik et al. |
| 6,043,311 A | 3/2000 | Houben et al. |
| 6,222,091 B1 | 4/2001 | Beihoffer et al. |
| 6,228,930 B1 | 5/2001 | Dairoku et al. |
| 6,359,049 B1 | 3/2002 | Carrico et al. |
| 6,376,072 B1 | 4/2002 | Evans et al. |
| 6,455,600 B1 | 9/2002 | Hahnle et al. |
| 6,562,879 B1 | 5/2003 | Hatsuda et al. |
| 6,565,981 B1 | 5/2003 | Messner et al. |
| 6,579,958 B2 | 6/2003 | Wilson |
| 6,803,107 B2 | 10/2004 | Mitchell et al. |
| 6,846,518 B2 | 1/2005 | Katoh et al. |
| 7,166,356 B2 | 1/2007 | Flohr et al. |
| 7,183,336 B2 | 2/2007 | Berlin et al. |
| 7,199,211 B2 | 4/2007 | Popp et al. |
| 7,259,212 B2 | 8/2007 | Popp et al. |
| 7,405,321 B2 | 7/2008 | Riegel et al. |
| 7,420,013 B2 | 9/2008 | Riegel et al. |
| 7,452,922 B2 | 11/2008 | Berlin et al. |
| 7,576,138 B2 * | 8/2009 | Flohr et al. ................. 522/3 |
| 7,655,830 B2 * | 2/2010 | Flohr et al. ................. 604/368 |
| 2002/0053754 A1 | 5/2002 | Katoh et al. |
| 2003/0045847 A1 | 3/2003 | Whitmore et al. |
| 2003/0135172 A1 | 7/2003 | Whitmore et al. |
| 2003/0233082 A1 | 12/2003 | Kline et al. |
| 2004/0137250 A1 | 7/2004 | Daniel et al. |
| 2004/0140070 A1 | 7/2004 | Ponomarenko et al. |
| 2004/0143030 A1 | 7/2004 | Ikkai |
| 2004/0155383 A1 | 8/2004 | Jackson et al. |
| 2004/0167486 A1 | 8/2004 | Busam et al. |
| 2005/0003176 A1 | 1/2005 | Katoh et al. |
| 2005/0048221 A1 | 3/2005 | Irie et al. |
| 2005/0142965 A1 | 6/2005 | LaFortune |
| 2005/0203474 A1 | 9/2005 | Flohr |
| 2005/0215752 A1 | 9/2005 | Popp et al. |
| 2005/0234410 A1 | 10/2005 | Ashton et al. |
| 2006/0020078 A1 | 1/2006 | Popp et al. |
| 2006/0052478 A1 | 3/2006 | Madsen et al. |
| 2006/0089611 A1 | 4/2006 | Herfert et al. |
| 2006/0128827 A1 | 6/2006 | Matsumoto et al. |
| 2006/0212011 A1 | 9/2006 | Popp et al. |
| 2006/0235141 A1 | 10/2006 | Riegel et al. |
| 2006/0247377 A1 | 11/2006 | Riegel et al. |
| 2007/0048516 A1 | 3/2007 | Flohr et al. |
| 2007/0048517 A1 | 3/2007 | Flohr et al. |
| 2007/0049689 A1 | 3/2007 | Meyer et al. |
| 2007/0082142 A1 | 4/2007 | Flohr |
| 2007/0167536 A1 | 7/2007 | Iwamura et al. |
| 2007/0238806 A1 | 10/2007 | Mitsukami et al. |

FOREIGN PATENT DOCUMENTS

| | | | |
|---|---|---|---|
| DE | 10 221 202 A | 7/2003 |
| EP | 0 248 437 A2 | 12/1987 |
| EP | 0 279 475 A2 | 8/1988 |
| EP | 0 246 848 A | 11/1988 |
| EP | 0 377 191 A2 | 7/1990 |
| EP | 0 514 775 A1 | 11/1992 |
| EP | 0 287 970 B1 | 1/1994 |
| EP | 0 700 673 A1 | 3/1996 |
| EP | 0 509 708 B1 | 12/1997 |
| EP | 0 811 636 B1 | 8/2001 |
| EP | 1 178 059 A2 | 2/2002 |
| EP | 1 199 327 A2 | 2/2002 |
| EP | 0 456 136 B1 | 3/2002 |
| EP | 1 302 485 A1 | 4/2003 |
| EP | 0 955 086 B1 | 9/2003 |
| EP | 0 844 270 B1 | 11/2004 |
| EP | 0 922 717 B1 | 1/2005 |
| EP | 1 504 771 A1 | 2/2005 |

| | | | |
|---|---|---|---|
| EP | 1 506 788 A | 2/2005 |
| EP | 1 516 884 A2 | 3/2005 |
| EP | 1 624 002 A1 | 8/2006 |
| EP | 1757646 A | 2/2007 |
| EP | 1 264 930 | 9/2008 |
| JP | 01-092226 A | 4/1989 |
| JP | 01-292103 | 11/1989 |
| JP | 2003-073919 | 3/2003 |
| JP | 2003 156961 A | 5/2003 |
| JP | 2006 169267 A | 6/2006 |
| JP | 2007 056071 A | 3/2007 |
| JP | 2007 077366 A | 3/2007 |
| JP | 2007 277466 A | 10/2007 |
| WO | WO 81/03274 A1 | 11/1981 |
| WO | WO 93/16131 A1 | 8/1993 |
| WO | WO 96/07380 | 3/1996 |
| WO | WO 99/55393 A | 11/1999 |
| WO | WO 0189591 A2 | 11/2001 |
| WO | WO 0189592 A2 | 11/2001 |
| WO | WO 02/094328 A | 11/2002 |
| WO | WO 02/0100912 | 12/2002 |
| WO | WO 03/043670 A1 | 5/2003 |
| WO | WO 2004/031253 A1 | 4/2004 |
| WO | WO 2004/085496 A | 10/2004 |
| WO | WO 2005/014066 A1 | 2/2005 |
| WO | WO 2005/044915 A1 | 5/2005 |
| WO | WO 2005/082429 A2 | 9/2005 |
| WO | WO 2005/097313 A1 | 10/2005 |
| WO | WO 2006/062253 A1 | 6/2006 |
| WO | WO 2006/062258 A2 | 6/2006 |
| WO | WO 2006/063229 A2 | 6/2006 |

OTHER PUBLICATIONS

Y. Tang, R.P. Thorn, R.L. Mauldin III, P.H. Wine, Kinetics And Spectroscopy Of the $SO_4$-Radical In Aqueous Solution, Journal of Photochemistry and Photobiology, A: Chemistry, 44(1988), pp. 243-258, Elsevier Sequoia/Printed in The Netherlands.

Om P. Chawla and Richard W. Fessenden, Electron Spin Resonance and Pulse Radiolysis Studies Of Some Reactions of $SO_4$, Radiation Research Laboratories and Department of Chemistry, Mellon Institute of Science, Carnegie-Mellon University, Pittsburgh, Pennsylvania 15213, The Journal of Physical Chemistry, vol. 79, No. 24, 1975.

"IUPAC Compendium of Chemical Terminology, $2^{ND}$ Edition" 1997, HTTP://GOLDBOOK.IUPAC.ORG/B00744.

* cited by examiner

METHOD OF SURFACE TREATING PARTICULATE MATERIAL USING ELECTROMAGNETIC RADIATION

CROSS REFERENCE TO RELATED APPLICATION

This application claims the benefit of U.S. Provisional Application No. 60/902,659, filed Feb. 22, 2007, the substance of which is incorporated herein by reference.

FIELD

The present disclosure relates to a method for making surface-treated particulate material using electromagnetic radiation, in particular a method of cross-linking superabsorbent polymer (SAP) particles using ultraviolet (UV) irradiation. The surface treatment is carried out on the surface of a rotating roll. The present disclosure also relates to absorbent articles comprising SAP particles made by said method.

BACKGROUND

Superabsorbent polymers (SAPs) are well known in the art. They are commonly applied in absorbent articles, such as diapers, training pants, adult incontinence products and feminine care products to increase the absorbent capacity of such products while reducing their overall bulk. SAPs are capable of absorbing and retaining amounts of aqueous fluids equivalent to many times their own weight.

Commercial production of SAPs began in Japan in 1978. The early superabsorbent was a cross-linked starch-g-polyacrylate. Partially neutralized polyacrylic acid eventually replaced earlier superabsorbents in the commercial production of SAPs, and has become the primary polymer in SAPs. SAPs are often applied in form of small particles. They generally consist of a partially neutralized lightly cross-linked polymer network, which is hydrophilic and permits swelling of the network once submerged in water or an aqueous solution such as physiological saline. The cross-links between the polymer chains assure that the SAP does not dissolve in water.

After absorption of an aqueous solution, swollen SAP particles become very soft and deform easily. Upon deformation the void spaces between the SAP particles are blocked, which drastically increases the flow resistance for liquids. This is generally referred to as "gel-blocking". In gel blocking situations liquid can move through the swollen SAP particles only by diffusion, which is much slower than flow in the interstices between the SAP particles.

One commonly applied way to reduce gel blocking is to make the particles stiffer, which enables the swollen SAP particles to retain their original shape thus creating or maintaining void spaces between the particles. A well-known method to increase stiffness is to cross-link the carboxyl groups exposed on the surface of the SAP particles. This method is commonly referred to as surface cross-linking.

The art refers e.g. to surface cross-linked and surfactant coated absorbent resin particles and a method of their preparation. The surface cross-linking agent can be a polyhydroxyl compound comprising at least two hydroxyl groups, which react with the carboxyl groups on the surface of the SAP particles. In some art, surface cross-linking is carried out at temperatures of 150° C. or above.

A water-soluble peroxide radical initiator as surface cross-linking agent is also known. An aqueous solution containing the surface cross-linking agent is applied on the surface of the polymer. The surface cross-linking reaction is achieved by heating to a temperature such that the peroxide radical initiator is decomposed while the polymer is not decomposed.

More recently the use of an oxetane compound and/or an imidazolidinone compound for use as surface cross-linking agent has been disclosed. The surface cross-linking reaction can be carried out under heat, wherein the temperature can be in the range of 60° C. to 250° C. Alternatively, the surface cross-linking reaction can also be achieved by a photo-irradiation treatment, such as by using ultraviolet rays.

In general, the surface cross-linking agent is applied onto the surface of the SAP particles. Therefore, the reaction can take place on the surface of the SAP particles, which results in improved cross-linking on the surface of the particles while not substantially affecting the core of the particles. Hence, the SAP particles become stiffer and gel-blocking is reduced.

A drawback of the commercial surface cross-linking process described above is that it takes relatively long, commonly at least about 30 min. However, the more time is required for the surface cross-linking process, the more surface cross-linking agent will penetrate into the SAP particles, resulting in increased cross-linking inside the particles, which has a negative impact on the capacity of the SAP particles. Therefore, it is desirable to have short process times for surface cross-linking. Furthermore, short process times are also desirable with respect to an overall economic SAP particle manufacturing process.

Another drawback of common surface cross-linking processes is that they take place only under relatively high temperatures, often around 150° C. or above. At these temperatures, not only the surface cross-linker reacts with the carboxyl groups of the polymer, but also other reactions are activated, such as anhydride-formation of neighbored carboxyl groups within or between the polymer chains, and dimer cleavage of acrylic acid dimers incorporated in the SAP particles. Those side reactions also affect the core, decreasing the capacity of the SAP particles. In addition, exposure to elevated temperatures can lead to color degradation of the SAP particles. Therefore, these side reactions are generally undesirable.

SAPs known in the art are typically partially neutralized, e.g. with sodium hydroxide. However, neutralization has to be carefully balanced with the need for surface cross-linking: The surface cross-linking agents known in the art react with free carboxyl groups comprised by the polymer chains at relatively high speed but react with a neutralized carboxyl groups only very slowly. Thus, a given carboxyl groups can either be applied for surface cross-linking or for neutralization, but not for both. Surface cross-linking agents known in the art can react with the chemical group carboxyl groups; they do not react with aliphatic groups.

In the process of making SAP particles, neutralization of free carboxyl groups typically comes first, before surface cross-linking takes place. Indeed, the neutralization step is often carried out in the very beginning of the process, before the monomers are polymerized and cross-linked to form the SAP. Such a process is named 'pre-neutralization process'. Alternatively, the SAP can be neutralized during polymerization or after polymerization ('post-neutralization'). Furthermore, a combination of these alternatives is also possible.

The overall number of free carboxyl groups on the outer surface of the SAP particles is limited by the foregoing neutralization but it is believed that the free carboxyl groups are also not homogeneously distributed. Hence, it is currently difficult to obtain SAP particles with evenly distributed surface cross-linking. On the contrary, often SAP particles have regions of rather dense surface cross-linking, i.e. with a relatively high number of surface cross-links, and regions of sparsely surface cross-linking. This inhomogeneity has a negative impact on the desired overall stiffness of the SAP particles.

It is therefore desirable to provide a method of making SAP particles with evenly distributed, homogenous surface cross-linking.

Moreover, it is difficult to obtain SAP particles having both, sufficient stiffness to avoid gel blocking (sometimes referred to as "gel strength") and sufficient swelling capacity (sometimes referred to as "gel volume"). Typically, increasing the gel strength of the SAP particles has a negative impact on the gel volume and vice versa.

Thus, it is further desirable to restrict the surface cross-links to the very surface of the SAP particles in order to minimize the decrease in capacity. Thus, the core of the SAP particles should not be considerably affected and the additional cross-links introduced in the core should be kept to a minimum.

Moreover, it is desirable to provide a method of surface cross-linking SAP particles, which can be carried out quickly to increase the efficiency of the method.

It is still further desirable to provide a method of surface cross-linking SAP particles, which can be carried out at moderate temperatures in order to reduce undesired side reactions, such as anhydride-formation and dimer cleavage.

SUMMARY

The present disclosure relates to a method of surface treating particulate materials. In various embodiments, the method comprises: providing a particulate material, providing a roll with an outer surface and a roll width, providing an irradiation source configured to emit electromagnetic radiation, feeding the particulate material onto the outer surface of the roll, rotating the roll, irradiating at least part of the particulate material with electromagnetic radiation from the irradiation source, while rotating the roll, and collecting the particulate material after the irradiating

BRIEF DESCRIPTION OF THE DRAWINGS

While the specification concludes with claims pointing out and distinctly claiming embodiments of the present disclosure, it is believed the same will be better understood by the following drawings taken in conjunction with the accompanying specification wherein like components are given the same reference number.

DETAILED DESCRIPTION

Figure 1:
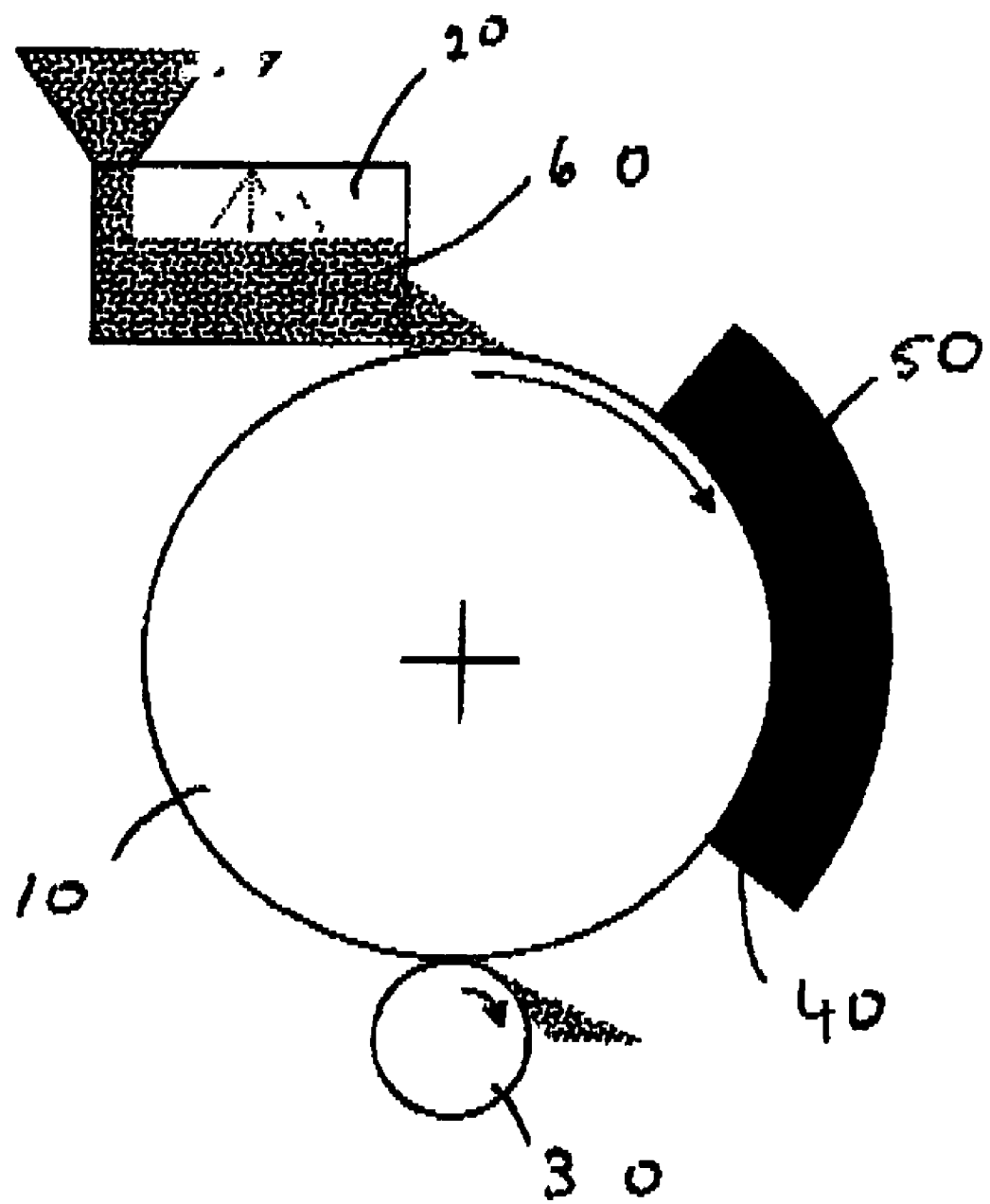
FIG. 1 is a schematic drawing of a roll reactor according to one embodiment of the present disclosure with an irradiation source outside the roll.

In one embodiment the method of the present disclosure is a method of surface cross-linking superabsorbent polymer particles.

In another embodiment the method of the present disclosure is a method of functionalizing superabsorbent polymer particles with functionalizers which are covalently bound to the surface of the polymer particles by a photochemical reaction. Suitable materials such as suitable precursor superabsorbent polymer particles and suitable functionalizer compounds are for example those described in EP 1 624 002 A1. The functionalizers can comprise a grafting unit with a radiation activatable group and a functional unit covalently bound to the grafting unit. The grafting unit can be bound to an aliphatic C—H group comprised at the surface of the precursor superabsorbent polymer particle. The functional unit can comprise chemical structures which are not present in the precursor superabsorbent polymer particle. These functional units can add an additional function to the precursor superabsorbent polymer particle or modify an existing function of the precursor superabsorbent polymer particle.

Particulate Material

In various embodiments of the present disclosure, particulate materials can be superabsorbent polymer particles (SAP). The SAPs according to the present disclosure can comprise a homo-polymer of partially neutralized $\alpha,\beta$-unsaturated carboxylic acid or a copolymer of partially neutralized $\alpha,\beta$-unsaturated carboxylic acid copolymerized with a monomer co-polymerizable therewith. Furthermore, the homo-polymer or copolymer can comprise aliphatic groups, wherein at least some of the aliphatic groups are at least partially comprised by the surface of the SAP particles.

SAPs are available in a variety of chemical forms, including substituted and unsubstituted natural and synthetic polymers, such as carboxymethyl starch, carboxymethyl cellulose, and hydroxypropyl cellulose; nonionic types such as polyvinyl alcohol, and polyvinyl ethers; cationic types such as polyvinyl pyridine, polyvinyl morpholinione, and N,N-dimethylaminoethyl or N,N-diethylaminopropyl acrylates and methacrylates, and the respective quaternary salts thereof. Typically, SAPs useful herein have a multiplicity of anionic, functional groups, such as sulfonic acid, and more typically carboxyl groups. Examples of polymers suitable for use herein include those, which are prepared from polymerizable, unsaturated, acid-containing monomers. Thus, such monomers include the olefinically unsaturated acids and anhydrides that contain at least one carbon-to-carbon olefinic double bond. More specifically, these monomers can be selected from olefinically unsaturated carboxylic acids and acid anhydrides, olefinically unsaturated sulfonic acids, and mixtures thereof.

Some non-acid monomers can also be included, usually in minor amounts, in preparing SAPs. Such non-acid monomers can include, for example, the water-soluble or water-dispersible esters of the acid-containing monomers, as well as monomers that contain no carboxylic or sulfonic acid groups at all. Optional non-acid monomers can thus include monomers containing the following types of functional groups: carboxylic acid or sulfonic acid esters, hydroxyl groups, amide-groups, amino groups, nitrile groups, quaternary ammonium salt groups, aryl groups (e.g., phenyl groups, such as those derived from styrene monomer). These non-acid monomers are well-known materials and are described in greater detail, for example, in U.S. Pat. No. 4,076,663 and in U.S. Pat. No. 4,062,817.

Olefinically unsaturated carboxylic acid and carboxylic acid anhydride monomers include the acrylic acids typified by acrylic acid itself, methacrylic acid, ethacrylic acid, $\alpha$-chloroacrylic acid, $\alpha$-cyanoacrylic acid, $\beta$-methylacrylic acid (crotonic acid), $\alpha$-phenylacrylic acid, $\beta$-acryloxypropionic acid, sorbic acid, $\alpha$-chlorosorbic acid, angelic acid, cinnamic acid, p-chlorocinnamic acid, $\beta$-sterylacrylic acid, itaconic acid, citroconic acid, mesaconic acid, glutaconic acid, aconitic acid, maleic acid, fumaric acid, tricarboxyethylene and maleic acid anhydride.

Olefinically unsaturated sulfonic acid monomers include aliphatic or aromatic vinyl sulfonic acids such as vinylsulfonic acid, allyl sulfonic acid, vinyl toluene sulfonic acid and styrene sulfonic acid; acrylic and methacrylic sulfonic acid such as sulfoethyl acrylate, sulfoethyl methacrylate, sulfopropyl acrylate, sulfopropyl methacrylate, 2-hydroxy-3-methacryloxypropyl sulfonic acid and 2-acrylamide-2-methylpropane sulfonic acid.

SAPs according to the present disclosure can contain carboxyl groups. These polymers comprise hydrolyzed starch-acrylonitrile graft copolymers, partially neutralized hydrolyzed starch-acrylonitrile graft copolymers, starch-acrylic acid graft copolymers, partially neutralized starch-acrylic acid graft copolymers, saponified vinyl acetate-acrylic ester copolymers, hydrolyzed acrylonitrile or acrylamide copolymers, slightly network crosslinked polymers of any of the foregoing copolymers, partially neutralized polyacrylic acid, and slightly network cross-linked polymers of partially neutralized polyacrylic acid, partially neutralized polymethacrylic acid, and slightly network cross-linked polymers of partially neutralized polymethacrylic acid. These polymers can be used either solely or in the form of a mixture of two or more different polymers, that when used as mixtures, individually do not have to be partially neutralized, whereas the resulting copolymer has to be. Examples of these polymer materials are disclosed in U.S. Pat. No. 3,661,875, U.S. Pat. No. 4,076,663, U.S. Pat. No. 4,093,776, U.S. Pat. No. 4,666,983, and U.S. Pat. No. 4,734,478.

Polymer materials for use in embodiments of the present disclosure can be slightly network cross-linked polymers of partially neutralized polyacrylic acids, slightly network cross-linked polymers of partially neutralized polymethacrylic acids, their copolymers and starch derivatives thereof. SAPs can comprise partially neutralized, slightly network cross-linked, polyacrylic acid (i.e. poly (sodium acrylate/acrylic acid)). SAPs can be at least 50 mol-%, or at least 70 mol-%, or more than 75 mol-%, or even more than 75 mol-%, or up to 95 mol-% neutralized. Network cross-linking renders the polymer substantially water-insoluble and, in part, determines the absorptive capacity of the hydrogel-forming absorbent polymers. Processes for network cross-linking these polymers and typical network cross-linking agents are described in greater detail in U.S. Pat. No. 4,076,663.

A suitable method for polymerizing the α,β-unsaturated carboxylic acid monomers is aqueous solution polymerization, which is well known in the art. An aqueous solution comprising α,β-unsaturated carboxylic acid monomers and polymerization initiator is subjected to a polymerization reaction. The aqueous solution may also comprise further monomers, which are co-polymerizable with the α,β-unsaturated carboxylic acid monomers. At least the α,β-unsaturated carboxylic acid should be partially neutralized, either prior to polymerization of the monomers, during polymerization or post polymerization.

The monomers in aqueous solution are polymerized by standard free radical techniques, commonly by using a photoinitiator for activation, such as ultraviolet (UV) light activation. Alternatively, a redox initiator may be used. In this case, however, increased temperatures may be necessary.

The water-absorbent resin can be lightly cross-linked to render it water-insoluble. The desired cross-linked structure may be obtained by co-polymerization of the selected water-soluble monomer and a cross-linking agent possessing at least two polymerizable double bonds in the molecular unit. The cross-linking agent is present in an amount effective to cross-link the water-soluble polymer. The amount of cross-linking agent is determined by the desired degree of absorption capacity and the desired strength to retain the absorbed fluid, that is, the desired absorption under load. Typically, the cross-linking agent is used in amounts ranging from 0.0005 to 5 parts by weight per 100 parts by weight of monomers (including α,β-unsaturated carboxylic acid monomers and possible co-monomers) used. If an amount over 5 parts by weight of cross-linking agent per 100 parts is used, the resulting polymer has a too high cross-linking density and exhibits reduced absorption capacity and increased strength to retain the absorbed fluid. If the cross-linking agent is used in an amount less than 0.0005 parts by weight per 100 parts, the polymer has a too low cross-linking density and when contacted with the fluid to be absorbed becomes rather sticky, water-soluble and exhibits a low absorption performance, particularly under load. The cross-linking agent will typically be soluble in the aqueous solution.

Alternatively to co-polymerizing the cross-linking agent with the monomers, it is also possible to cross-link the polymer chains in a separate process step after polymerization.

After polymerization, cross-linking and partial neutralization, the viscous SAPs are dehydrated (i.e. dried) to obtain dry SAPs. The dehydration step can be performed by heating the viscous SAPs to a temperature of about 120° C. for about 1 or 2 hours in a forced-air oven or by heating the viscous SAPs overnight at a temperature of about 60° C. The content of residual water in the SAP after drying predominantly depends on drying time and temperature. According to the present disclosure, "dry SAP" refers to SAP with a residual water content of from 0.5% by weight of dry SAP up to 50% by weight of dry SAP, or from 0.5%-45% by weight of dry SAP, or 0.5%-30%, or 0.5%-15%, or even 0.5%-5%. If not explicitly said to be otherwise, in the following the term "SAP particles" refers to dry SAP particles.

The SAPs can be transferred into particles of numerous shapes. The term "particles" refers to granules, fibers, flakes, spheres, powders, platelets and other shapes and forms known to persons skilled in the art of SAPs. E.g. the particles can be in the form of granules or beads, having a particle size of about 10 μm to 1000 μm, such as about 100 μm to 1000 μm. In another embodiment, the SAPs can be in the shape of fibers, i.e. elongated, acicular SAP particles. In those embodiments, the SAP fibers have a minor dimension (i.e. diameter of the fiber) of less than about 1 mm, usually less than about 500 μm, and such as 250 μm down to 50 μm. The length of the fibers can be about 3 mm to about 100 mm. In some embodiments of the present disclosure, the fibers can also be in the form of a long filament that can be woven.

However, as the method of the present disclosure is carried out on the surface of a roll reactor, the SAP particles, optionally together with radical former molecules and optionally water, should have sufficient flowing ability to be spreadable or coatable on the surface of a roller.

The SAP particles of the present disclosure have a core and a surface. According to the present disclosure the SAP particles undergo a surface cross-linking process step, i.e. they are cross-linked in their surface while the number of cross-links in the core of the particle is not substantially increased by the method of the present disclosure.

The term "surface" describes the outer-facing boundaries of the particle. For porous SAP particles, exposed internal surfaces may also belong to the surface. For the present disclosure, "surface" of the SAP particles refers to the complete and continuous outwardly facing 6% volume of the dry SAP particle, whereas "core" refers to 94% of the volume and comprises the inner regions of the dry SAP particle.

Surface cross-linked SAP particles are well known in the art. In surface cross-linking methods of the prior art, a surface cross-linker is applied to the surface of the SAP particles. In a surface cross-linked SAP particle the level of cross-links in the surface of the SAP particle is considerably higher than the level of cross-links in the core of the SAP particle.

Commonly applied surface cross-linkers are thermally activatable surface cross-linkers. The term "thermally activatable surface cross-linkers" refers to surface cross-linkers, which only react upon exposure to increased temperatures, typically around 150° C. Thermally activatable surface cross-linkers known in the prior art are e.g. di- or polyfunctional agents that are capable of building additional cross-links between the polymer chains of the SAPs. Typical thermally activatable surface cross-linkers include, e.g., di- or polyhydric alcohols, or derivatives thereof, capable of forming di- or polyhydric alcohols. Representatives of such agents are alkylene carbonates, ketales, and di- or polyglycidylethers. Moreover, (poly)glycidyl ethers, haloepoxy compounds, polyaldehydes, polyoles and polyamines are also well known thermally activatable surface cross-linkers. The cross-link is for example formed by an esterification reaction between a carboxyl group (comprised by the polymer) and a hydroxyl group (comprised by the surface cross-linker). As typically a relatively big part of the carboxyl groups of the polymer chain is neutralized prior to the polymerization step, commonly only few carboxyl groups are available for this surface cross-linking process known in the art. E.g. in a 70% percent neutralized polymer only 3 out of 10 carboxylic groups are available for covalent surface cross-linking.

The method of the present disclosure is used for surface cross-linking of SAP particles. Hence, the polymer chains comprised by the SAP particles already have been cross-linked by a cross-linker known in the art, comprising at least two polymerizable double bonds in the molecule unit.

In the method of the present disclosure, direct covalent bonds between carbon atoms comprised in the backbone of different polymer chains are formed in the surface of the SAP particles.

A "direct covalent bond" according to the present disclosure is a covalent bond wherein polymer chains are bound to each other only via a covalent bond with no intermediate atoms, such as atoms comprised by a cross-linking molecule. In contrast, known cross-linking reactions between polymer chains always result in covalent bonds between these polymer chains, wherein the reaction product of the cross-linking molecule is built in between the polymer chains. Thus, known surface cross-linking reactions do not result in a direct covalent bond but in an indirect covalent bond comprising the reaction product of the cross-linking molecule. The direct covalent bond is formed between a carbon atom in the backbone of a first polymer chain and a carbon atom in the backbone of a second polymer chain. The bonds are formed intra-particulate within the SAP particle, more specifically they are formed in the surface of the SAP particles, while the core of the SAP particles is substantially free of such direct covalent bonds.

The "backbone" of a polymer chain refers to those carbon atoms which immediately form the polymer chain. Principally, if a reaction resulted in the removal of a carbon atom, which is part of the polymer chain backbone, this reaction would also result in the break of the polymer chain on the position, where this carbon atom had previously been built into the polymer chain.

Optionally, surface cross-linking molecules may also be used for the method of the present disclosure. In such embodiments wherein surface cross-linking molecules are added to the SAP particles, additional covalent bonds are formed between the polymer chains comprised in the surface of the SAP particles. These additional covalent bonds comprise the reaction product of said surface cross-linking molecules.

The cross-linking of different polymer chains of the present disclosure is not intended to bond different SAP particles to each other. Thus, the method of the present disclosure does not lead to any appreciable inter-particulate bonds between different SAP particles but only results in intra-particulate direct covalent bonds within an SAP particle. If present, such inter-particulate direct covalent bonds would hence require additional inter-particulate cross-linking materials.

The method of the present disclosure which directly bonds polymer chains to each other by a covalent bond between two carbon atoms can be applied for surface cross-linking SAP particles instead of or additional to conventional surface cross-linking.

Radiation Activatable Radical Former Molecules

In the present disclosure, radical former molecules can be applied to initiate the surface cross-linking reaction: The radiation activatable radical former molecules are able to form carbon centered radicals located in the polymer backbone of polymer chains comprised in the surface of the SAP particles. This reaction takes place upon UV irradiation. Two of these carbon centered radicals comprised in different polymer chains are able to react with each other and thereby form a direct covalent bond between the polymer chains.

Upon irradiation, some of the radical formers form, in a first step, an intermediate radical, which is typically oxygen-centered, and which may, in a second step, react with a carbon atom comprised in the polymer backbone in the surface of the SAP particle to form a carbon centered radical in the polymer backbone.

In principle, any photo-initiator which is typically used to start the polymerization of vinyl monomers can be applied as a radical former for surface cross-linking according to the present disclosure. Such photoinitiators typically serve to trigger radical chain polymerizations of vinyl monomers. It is believed that the reactive intermediate species, which is formed upon irradiation of the photoinitiator with UV radiation, is capable of abstracting hydrogen atoms from C—H bonds of C atoms comprised by the polymer backbone of polymer chains in the surface of the SAP particle (therewith initiating the cross-linking according to the present disclosure).

The radiation activatable radical former molecule can comprise a peroxo bridge (O—O), which is homolytically cleaved upon UV irradiation (so-called photo-fragmentation), yielding oxygen centered radicals, which have the advantage of typically not reacting with the oxygen from ambient atmosphere, which would otherwise quench the reaction. Further, two of these active species are formed from one radical former molecule (if it is symmetric), which are both in close proximity so that also the carbon-centered radicals formed in the succeeding step are in close proximity and can more easily combine to form said direct covalent bond.

However, reactive intermediate species can also be ketones which—upon UV irradiation—have been transferred into short-lived, a so-called excited triplet state. The ketone in the triplet-state is also capable of abstracting hydrogen from C—H bonds of C atoms comprised by the polymer backbone whereby the ketone is converted into an alcohol (so-called photo reduction).

The radical former of the present disclosure can be water soluble. The water soluble radical former should exhibit a solubility in water of at least 1 wt %, or at least 5 wt %, or even at least 10 wt % at 25° C.

Radical formers, which are not initially water soluble, can be rendered water soluble by derivatization, e.g. by introducing a charged group into the molecular structure, such as carboxylate or ammonium. As an example, benzophenone can be easily derivatized into benzoyl benzoic acid. However, the radical formers can be inherently water soluble, i.e. the introduction of a functional group is not required to render them water-soluble. Typical inherently water soluble radiation activatable radical formers are peroxides like alkali-metal or other inorganic peroxodisulfates or derivatized organic peroxodisulfates. Water-soluble azo-initiators can be used as well (such as the commercially available V-50 or VA-086, Wako Specialty Chemicals). Inorganic peroxides typically fulfill the requirement of water solubility, while organic compounds typically require derivatization. Examples of water-soluble radical formers are peroxodisulfates such as sodium peroxodisulfate or ammonium peroxodisulfate.

The advantage of providing the radical former in an aqueous solution (and hence, the advantage of using a water-soluble radical former) is manifold: First, the aqueous solution facilitates an efficient wetting of the SAP particle surface. Thus, the radical former molecules are actually transported into the particle surface, where they initiate the surface cross-linking reaction.

Second, efficient wetting of the SAP particle surface enhances the chain mobility of the polymer chains comprised in the surface of the SAP particles. This facilitates the bimolecular reaction between the carbon atoms comprised in the polymer backbone and the reactive intermediate species, into which the radical former is transformed upon irradiation. This effect is particularly advantageous for SAP particles comprised of poly(meth)acrylic acid, which are in fact the most widely used SAP particles of today. Polyacrylic acid possesses a glass transition temperature of 106° C. and the sodium salt of polyacrylic acid, at a neutralization degree of 100%, has a glass transition temperature of above 200° C. while the surface cross-linking of the present disclosure is typically carried out at temperatures below 100° C. In the presence of water, the glass transition temperature of partly neutralized polyacrylic acid can be significantly decreased. E.g., the glass transition temperature of a 65% neutralized sodium polyacrylate can be reduced from ca. 150° C. in the presence of 5 wt % water to below room temperature in the presence of 35 wt % water. However, to make use of this effect, the actual local water concentration directly in the surface of the SAP particle is important. As the glass transition temperature of partly neutralized poly(acrylic acid) increases with an increasing molar neutralization degree, the amount of water required may be adjusted accordingly, in the sense that more water is added for superabsorbent polymer particles with a higher neutralization degree. Neutralization degrees which are higher than the typically used 75% in state of the art SAPs are advantageous for the aforementioned reasons. The reasons are lower ingoing material cost and higher osmotic pressure enabling better absorption. An advantage of the present disclosure arises thereof since the method enables in particular the successful surface cross-linking of SAPs with neutralization above 75% by enabling to convert SAPs at high throughputs in the presence of higher amounts of water.

Third, the water applied to the surface of the superabsorbent particles further enhances the transparency of the material to UV radiation. Fourth, the presence of water on the surface, limits the accessibility of oxygen from the ambient atmosphere to the aforementioned carbon centered radicals, which are formed as intermediates of the cross-linking reaction. Typically, oxygen, which is a bi-radical, acts as a scavenger towards carbon-centered radicals and hence keeps them from combining. As the solubility of oxygen in water is limited and the diffusion of oxygen from the ambient atmosphere through the water film to said carbon-centered radicals is slow compared to radical reactions induced by the UV irradiation, the undesired supply of oxygen to the reaction centers can be effectively limited and the undesired side reaction, detracting from cross-linking, can be suppressed. So, the need for an inert atmosphere, which would incur significantly increased investment and utility cost, can be avoided. The more water is added, the more pronounced are these four advantageous effects and can add to the overall process efficiency and better performance of the material resulting from the process. On the other hand, the amount of added water should not be too high to avoid that the superabsorbent particles resulting from this process bear a too high amount of water which could detract from absorption capacity and enhances transportation cost and too much excess water would have to be removed in a subsequent drying step.

To ensure that the cross-linking of the present disclosure is actually restricted to the surface of the SAP particles, the water should be prevented from evenly distributing throughout the whole particle volume via diffusion. Therefore, the UV irradiation step should follow not later than one hour after the aqueous solution comprising the radical former has been applied onto the SAP particles, or not later than 10 minutes or even not later than 1 minute.

Water-soluble radical formers can be used, as organic solvents are typically more expensive than water and are also more problematic from an environmental standpoint. However, organic radial formers which have not been rendered water-soluble via the above-described derivatization may also be used and can be applied in an organic solvent rather than in water. Examples are benzophenone or any other suitable ketone which is known to undergo photoreduction when irradiated with UV radiation. A further example is dibenzoyl peroxide or any other organic peroxide which is known to undergo photo fragmentation when irradiated with UV radiation.

In the method of the present disclosure, the radical former can be applied in amounts of less than 25% by weight of SAP particles, or in amounts of less than 15%, or even in amounts from 1% to 5%. The radical former is typically applied in aqueous solution. Alternatively, the radical former and the water can be added in two steps, as long as they are present on the surface during irradiation. A water content of the SAP particles can help to accelerate the cross-linking reaction and at the same time renders the particle surface sticky which helps to temporarily attach the particles to the roll surface. For example, SAP particles containing water can be easily applied on the roll as a monolayer and then be very rapidly cross-linked within seconds or less. This is probably due to creating a local aqueous solution on the surface of the particles with mobile polymeric chain segments which enable the reaction to proceed. The amount of water can be less than 45% by weight of SAP particles, e.g. from 8 to 40% by weight; or less than 30% or less than 15%. For economic reasons, the amount of water added can be reduced to shorten or entirely avoid a drying step after the surface cross-linking.

Surface Cross-Linking Molecules

The surface cross-linking molecule is any compound having at least two functional groups which can react with the aforementioned carbon-centered radicals located in the backbone of the polymer chains comprised in the surface of the SAP particles. Upon reaction of the functional group in the surface cross-linking molecule with the carbon-centered radical, a new covalent bond is formed, grafting the cross-linking molecule onto the polymer backbone.

The functional groups of the surface cross-linking molecules can be C=C double bonds. Alternatively, a cross-linking molecule can comprises more than two C=C double bonds. The functional groups can also be CH—X moieties, with X being a hetero atom. An example of a CH—X moiety is an ether, CH—O—R, with R being an alkyl residue.

Cross-linking molecules of the present disclosure can be polyfunctional allyl and acryl compounds, such as triallyl cyanurate, triallyl isocyanurate, trimethylpropane tricrylate or other triacrylate esters, pentaerythritol triallyl ether, pentaerythritol tetraallyl ether, butanediol diacrylate, pentaerythritol tetraacrylate, tetra allylorthosilicate, di-pentaerythritol pentaacyralate, di-pentaerythritol hexaacyralate, ethyleneglycol diacrylate, ethyleneglycol dimethacrylate, tetra allyloxy ethane, diallyl phthalate, diethyleneglycol diacrylate, allylmethacrylate, triallylamine, 1,1,1-trimethylolpropane triacrylate, triallyl citrate, or triallyl amine.

Alternatively, the cross-linking molecules are selected from the group consisting of squalene, N,N' methylenebisacrylamide, icosa-pentaenic acid, sorbic acid or vinyl terminated silicones.

Compounds with allylic double bonds can be used. As an example, a cross-linking molecule of the present disclosure can be diallyl dimethyl ammonium chloride.

If surface cross-linking molecules are applied, they should be added e.g. by spray application in a solution with an inert solvent (that can be optionally evaporated) before the SAP particles are fed onto the roll reactor of the present disclosure. The surface cross-linking molecules can be applied in an organic solvent like dichloromethane which is evaporated directly after application. In embodiments, wherein the SAP particles are moisturized, the surface cross-linking molecules can also be applied together with the water as a suspension or, if the surface cross-linking molecules are water soluble, as a solution.

Moreover, if surface cross-linking molecules are applied the molar ratio of surface cross-linking molecules to radical former can be in the range of from 0.2 to 5, or from 0.33 to 3 or even from 1 to 3.

The surface cross-linking compound can be water-soluble, so that it can be applied in aqueous solution together with the radical former (if radical formers are used). If a water-insoluble surface cross-linking molecules is applied, it may be emulsified or suspended in the aqueous solution comprising the optional radical former or be applied separately. Water-insoluble surface cross-linking molecules can also be applied in an organic solvent like dichloromethane which is evaporated directly after application.

The surface cross-linking molecules and/or the radical former may be sprayed onto the SAP particles by means of a fluidized-bed spraying chamber. Simultaneously IR-irradiation may be applied to accomplish drying. Instead or in combination with IR-light, any conventional drying equipment can be used for drying. However, in certain embodiments of the present disclosure little or no drying is required, e.g. in cases, where only small amounts of surface cross-linking molecules and/or the radical former are applied, dissolved in small amounts of solution.

According to the method of the present disclosure, the surface cross-linking molecules and/or the radical formers are always applied onto the SAP particles prior to irradiation.

Reaction Mechanism with Radical Formers and with Optional Surface Cross-Linking Molecules:

The radical former molecules undergoing photo-fragmentation comprise a labile bond, and are hereinafter generally depicted as $R_a$-$R_b$. Upon UV irradiation, the labile bond breaks, whereby two radicals ($R_a$' and $R_b$') are formed according to Formula 1.

Formula 1:

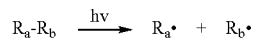

This homolytic cleavage may result in two identical radicals, if the labile bond comprised by the radical former molecule (so-called precursor molecule) divides the molecule into two identical parts. Alternatively, the homolytic cleavage may result in two different radicals.

The radicals, which have been formed, can now react with an aliphatic C—H group comprised in the backbone of the polymer chains in the surface of the SAP particle forming a carbon-centered radical in the polymer backbone according to Formula 2. Two such carbon-centered radicals can react with each other to form a direct covalent bond between the carbon atoms comprised in the polymer backbone.

Formula 2:

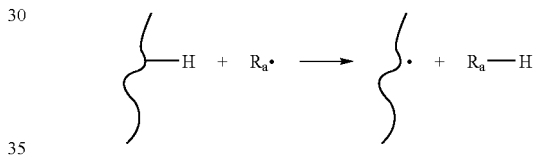

It is principally also possible that instead of abstracting a hydrogen atom from a carbon-hydrogen bond comprised in the backbone of the polymer chain, a complete carboxyl group is abstracted from the polymer chain (decarboxylation). As a result of this reaction a carbon-centred radical is formed in the backbone of a polymer chain comprised in the surface of the SAP particle.

Optionally, surface cross-linking molecules may be additionally used for the method of the present disclosure. In such embodiments, the radicals formed from the radical former molecule, can react with one of the C=C double bonds comprised by the cross-linking molecule to form a radical consisting of the reaction product of the cross-linking molecule and the initial radical according to Formula 3.

Formula 3:

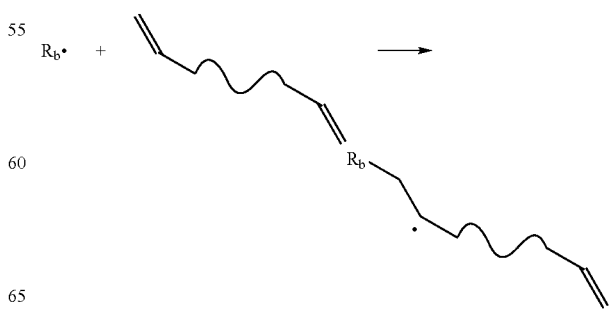

The carbon-centered radical within the polymer chain segment formed in the reaction of Formula 2 can react with the radical formed in Formula 3. The reaction product of this reaction is a polymer chain wherein the reaction products of the radical former molecule and the cross-linking molecule are covalently bound to a carbon atom of the polymer backbone according to Formula 4.

Formula 4:

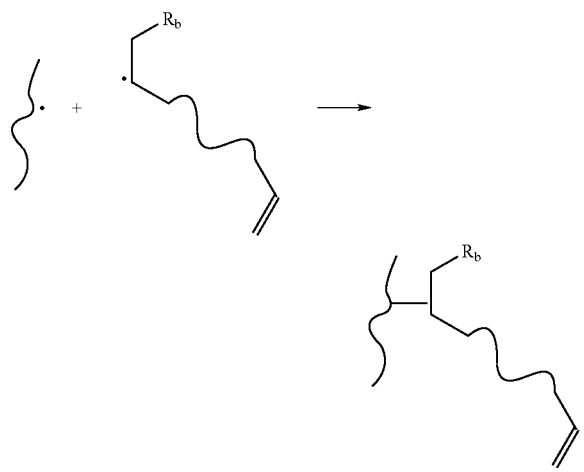

Thereafter, the radicals formed from the radical former molecule in Formula 1, can react with the second of the C═C double bonds of the cross-linking molecule, which is comprised in the reaction product of Formula 4. This reaction is depicted in Formula 5:

Formula 5:

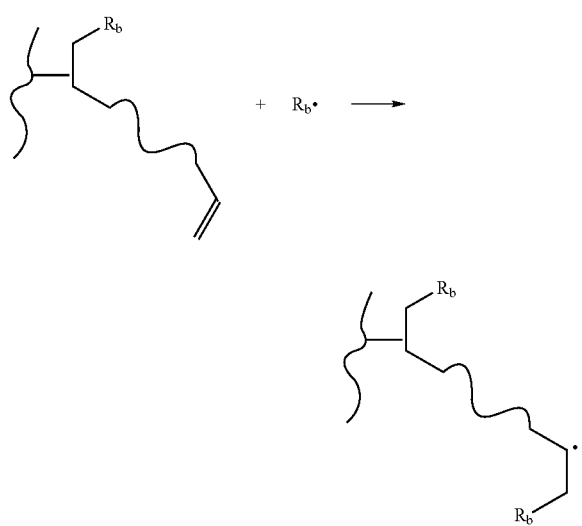

To form the cross-link between two polymer chains, the carbon-centered radical which is comprised in the reaction product of Formula 3 combines with another carbon centered radical comprised in another polymer chain in the surface of the same SAP particle as depicted in Formula 6.

Formula 6:

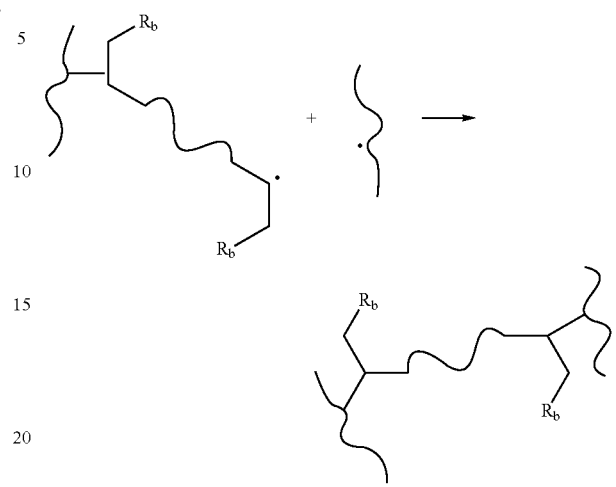

The net reaction when using radical former molecules undergoing photo-fragmentation upon irradiation is the formation of a cross-link between two polymer chain segments, wherein the cross-link comprises the reaction product of one cross-linking molecule with two C═C double bonds and two radical former molecules. The net reaction is depicted in Formula 7:

Formula 7:

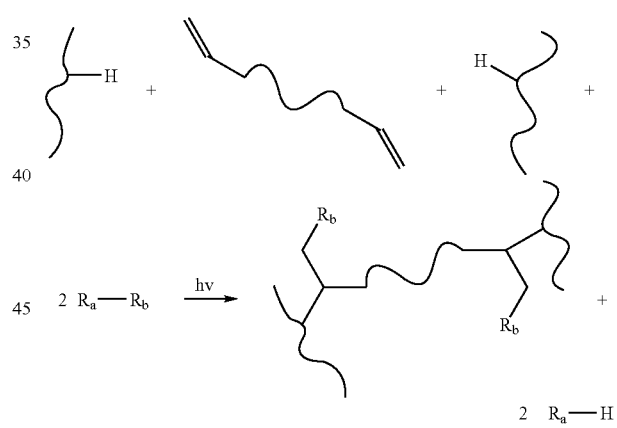

With the additional use of surface cross-linking molecules the efficiency of the reaction can be further enhanced due to shorter reaction times: Without wanting to be bound by theory, it is believed that the rate determining step of a UV irradiation initiated surface cross-linking reaction in the absence of surface cross-linking molecules is the recombination of two carbon-centered radicals, forming a direct covalent bond between two carbon atoms comprised in two different polymer chains. This recombination follows a kinetic law of a second order, i.e. the reaction rate is proportional to the concentrations of both reactants (i.e. the two combining carbon-centered radicals) multiplied with each other.

If, however, surface cross-linking molecules are added, it is believed, that the reaction between the radical formed from the surface cross-linking molecule and the carbon-centered radical comprised in the polymer chain follows a kinetic law of pseudo-first order, i.e. the reaction rate is only proportional to the concentration of the carbon-centered radical, since the concentration of the second reaction partner, i.e. the radicals formed from the surface cross-linking molecule, is so high that it can be regarded as constant throughout the reaction. Reactions of pseudo-first order kinetics are known to be kinetically favored versus reactions of second order kinetics, i.e. they have a higher reaction speed.

Alternatively to radical former molecules undergoing photo-fragmentation it is also possible to use radical former molecules undergoing photo-reduction upon irradiation comprise carbonyl groups. In some embodiments of the present disclosure, such radical former molecules are ketones.

Upon UV irradiation, the radical former molecules of this type are transferred in an "excited state" (triplet state). Hence, they are not yet transformed into a radical, but are much more reactive than prior to irradiation.

In the next step, the radical former molecule in its excited state reacts with an aliphatic C—H group comprised in the backbone of a polymer chain in the surface of the SAP particle and abstracts a hydrogen radical, thereby forming a carbon-centered radical at this polymer chain and a ketyl radical according to Formula 8:

Formula 8:

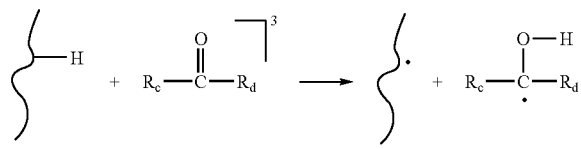

The ketyl radical can now react with one of the C=C double bonds of the cross-linking molecule. Principally for the carbon-centered radicals comprised in the backbone of the polymer chains the same reactions take place as shown in FIGS. 3 to 7.

Alternatively (or exclusively in embodiments which do not use surface cross-linking molecules) two ketyl radicals can recombine with one another to form a so-called pinacol, e.g. benzpinacol, for benzophenone as initiator.

It should be noted, that in the case of radical former molecules undergoing photo-fragmentation are applied, only a part of the radical former molecule is comprised by the cross-link between the polymer chains, whereas for radical former molecules undergoing photo-reduction, the complete radical former molecule in its reduced form (with a carbonyl group being reduced to a hydroxyl group) is comprised by the cross-link between the polymer chains.

Hence, for radical former molecules undergoing photo-fragmentation, the reaction product comprised by the cross-link between polymer chains is only a part of the initial radical former molecule—typically one half of the initial molecule.

For radical former molecules undergoing photo-reduction, the reaction product comprised by the cross-link between polymer chains is the complete radical former molecule in its reduced form (with a carbonyl group being reduced to a hydroxyl group).

The reaction product of the surface cross-linking molecule—for both types of radical former molecules—is the initial cross-linking molecule, wherein those C=C double bonds, which have reacted with the radicals formed from the radical former molecules (or have reacted directly with the carbon-centered radicals formed in the polymer chain segments) are converted into C—C single bonds.

In some embodiments of the present disclosure—for both types of radical former molecules—the surface cross-linking molecules comprise more than two C=C double bonds. In these embodiments, more than two polymer chain segments can be cross-linked to each other, following the reactions described above. In these embodiments, the number of reaction products of radical former molecules comprised by the cross-link equals the number of C=C double bonds comprised by the cross-linking molecule.

Theoretically, the radicals formed from the radiation activatable radical former molecules may also react with carboxyl groups comprised by the polymer chain segments. However, it is much more likely that the radical will react with the aliphatic C—H bond, as it is thermodynamically and kinetically rather unlikely that the radical will be able to abstract a hydrogen radical from a O—H bond comprised by a carboxyl group, as the carboxyl group is strongly polarized.

Principally, it is also possible that instead of abstracting a hydrogen atom from a carbon-hydrogen bond comprised in the backbone of the polymer chain, a complete carboxyl group is abstracted from the polymer chain (decarboxylation). The result of this reaction is the same as if a hydrogen atom is abstracted, i.e. a carbon-centred radical is formed in the backbone of a polymer chain comprised in the surface of the SAP particle.

According to the present disclosure, only one type of cross-linking molecules may be used or, alternatively, two or more chemically different cross-linking molecules can be applied. Likewise, only one type of radiation activatable radical former molecule can be used or, alternatively, two or more chemically different radiation activatable radical former molecules can be applied.

Since the stickiness of SAP particles increases with increasing water amount, it has proven advantageous for practical purposes to apply a mixing aid to the surface of the particles. Its presence decreases the tendency of particles to agglomerate or soil equipment parts throughout the conversion process which get into contact with the water-containing SAP. Suitable mixing aids are described for example in WO 2006/062258. The mixing aid can be a water soluble or water dispersible compound. An exemplary mixing aid in the current disclosure is polyethylene glycol monoethyl ether. Amounts of mixing aids can be below 10 weight %, or below 5 weight % or even between 0.5 and 2 weight %.

With the method of the present disclosure the number of available reaction sites for surface cross-linking the SAP particles is considerably increased compared to surface cross-linking known in the art. Therefore, it is possible to achieve a far more homogenous, uniform surface cross-linking compared to the surface cross-linking known in the art. Due to the homogenous distribution of the surface cross-links in the SAP particle surface, the overall number of surface cross-links does not necessarily have to be increased compared to surface cross-linking known in the art, in order to improve the overall stiffness and gel-strength of the SAP particles.

To ensure that SAP particles with evenly distributed surface cross-linking are obtained, the radical former and the optional surface cross-linking molecules have to be distributed evenly on the SAP particle. Therefore, the surface cross-linker can be applied by spraying onto the SAP particles.

Also, compared to the surface cross-linking known from the prior art, the surface cross-linking according to the present disclosure is significantly faster. Prior art surface cross-linking reactions carried out under increased temperatures commonly take up to 45 minutes. This time consuming process step renders the manufacturing process of SAP particles less economic than desirable. In contrast, the cross-linking process according to the present disclosure can be carried out within a significantly shorter reaction time, typically within seconds, and hence, enables an overall improvement with respect to manufacturing times of the SAP particles. This results in lower energy costs and higher throughput.

Furthermore, as the surface cross-linking reaction proceeds quickly, the radical former molecules and—optionally—surface cross-linking molecules applied on the surface of the SAP particles have less time to penetrate inside the SAP particles. Hence, compared to prior art surface cross-linking, it is easier to actually restrict surface cross-linking to the surface of the SAP particles and to avoid undesired further cross-linking reactions in the core of the SAP particles.

Another advantage of the present disclosure refers to the neutralization step: The α,β-unsaturated carboxylic acid monomers are often neutralized prior to the polymerization step (pre-neutralization). Compounds, which are useful to neutralize the acid groups of the monomers, are typically those, which will sufficiently neutralize the acid groups without having a detrimental effect on the polymerization process. Such compounds include alkali metal hydroxides, alkali metal carbonates and bicarbonates. The material used for neutralization of the monomers can be sodium- or potassium-hydroxide, or sodium- or potassium-carbonate. As a result, the carboxyl groups comprised by the α,β-unsaturated carboxylic acid of the polymer are at least partially neutralized. In case sodium hydroxide is used, neutralization results in sodium acrylate, which dissociates in water into negatively charged acrylate monomers and positively charged sodium ions. As the surface cross-linkers known in the art react with the carboxyl groups of the polymer, the degree of neutralization has to be balanced with the need to surface cross-link, because both process steps make use of the carboxyl groups.

If the final SAP particles are in the swollen state, after they absorbed aqueous solution, the sodium ions are freely movable within the SAP particles. In absorbent articles, such as diapers or training pants, the SAP particles typically absorb urine. Compared to distilled water, urine comprises a relatively high amount of salt, which at least partly is present in dissociated form. The dissociated salts comprised by the urine make absorption of liquid into the SAP particles more difficult, as the liquid has to be absorbed against an osmotic pressure caused by the ions of the dissociated salts. The freely movable sodium ions within the SAP particles strongly facilitate the absorption of liquid into the particles, because they reduce the osmotic pressure. Therefore, a high degree of neutralization can largely increase the capacity of the SAP particles and the speed of liquid absorption.

Furthermore, a higher degree of neutralization typically reduces the materials expenses and, consequently, also reduces the overall manufacturing costs for SAP particles: Sodium hydroxide, which is commonly used to neutralize the polymer, is typically less expansive compared to acrylic acid, which can be a polymer of today's SAPs. Hence, increasing the neutralization degree increases the amount of sodium hydroxide comprised by a given amount of SAP. Consequently, less acrylic acid is required for making SAPs.

A still further advantage of the present disclosure is the reduction of undesired side-reactions during the surface cross-linking process. Surface cross-linking known in the prior art requires increased temperatures, commonly around or above 150° C. At these temperatures, not only surface cross-linking is achieved, but also a number of other reactions take place, e.g. anhydride-formation within the polymer or dimer cleavage of dimers previously formed by the acrylic acid monomers. These side-reactions are highly undesired, because they result in SAP particles with decreases capacity.

As the surface cross-linking process according to the present disclosure does not necessarily need increased temperatures but can also be carried out at moderate temperatures, those side-reactions are considerably reduced. According to the present disclosure, the surface cross-linking reaction can be accomplished at temperatures of less than 100° C. to avoid the undesired side reactions.

Also, at elevated temperatures around or above 150° C. commonly applied in the surface cross-linking process known in the prior art, the SAP particles sometimes change their color from white to yellowish. Due to the reduced temperatures required for surface cross-linking in the method of the present disclosure, the problem of color degradation of the SAP particles can be considerably reduced.

The surface cross-linking according to the method of the present disclosure can optionally, be carried out together with one or more thermally activatable surface cross-linkers known in the art, e.g. 1,4-butandiol. In this case, however, both, UV radiation and increased temperatures (typically above 140° C.), are required. In these embodiments, the surface of the resulting SAP particles will further comprise the reaction product of the thermally activatable surface cross-linker.

The method of the present disclosure may further comprise an optional washing step to wash off un-reacted surface cross-linking molecules and/or radical former molecules or to wash off molecules formed by side reactions.

UV Irradiation

In some embodiments of the present disclosure, SAP particles are exposed to ultraviolet- (UV-) radiation. The UV-domain of the electromagnetic spectrum is defined between wavelengths of 100 and 380 nm and is divided into the following ranges: UV-A (315 nm-400 nm), UV-B (280 nm-315 nm), UV-C (200 nm-280 nm) and Vacuum UV (VUV) (100 nm-200 nm).

UV radiation within the UV-A, UV-B or UV-C range depending on the presence, concentration and nature of a photo-initiator, commercially available mercury arcs or metal halide radiation sources can be used. The choice of the radiation source depends on the absorption spectrum of the radical initiator and on the reactor geometry to be used. The UV-B range proved to be most favorable in the present disclosure, in combination with the afore-described initiators. In one embodiment of the disclosure, different light spectrums are used at different stages of the cross-linking process, for example starting with shorter UV wavelength and ending with longer UV wavelength when the initiator gets used up. This can be achieved by using lamps with different filters. Without wanting to be bound by theory, it is believed that the radical formers in the present disclosure, sodium peroxodisulfate and ammonium peroxodisulfate, which have higher extinction coefficients for shorter wavelengths and are hence cleaved more efficiently at lower wavelength radiation, also protect the SAP from damage caused by the same short wavelength radiation. Without wanting to be bound by theory, it is believed that said protecting effect of the radical formers can be described in analogy to that of the short-wavelength filtering ingredients in a suntan lotion applied to human skin. Since, however, in the present process the concentration of the radical formers decreases with progressing conversion, they can offer less and less protection to the shorter wavelengths so that it turned out advantageous to complete the conversion of the radical former with UV light whose shorter wave-length spectral parts have been filtered out. For the present disclosure, with use of the radical formers sodium peroxodisulfate or ammonium peroxodisulfate, it is advantageous to start the irradiation using a spectrum of 201 to 250 nm and to drive conversion to completion using a spectrum of 220 to 250 nm. Since backmixing of the particles during irradiation is minimized or can be even completely excluded (depending on the different embodiments of the present disclosure), each different degree of conversion of the radical former during the reaction can be ascribed to a defined position of the material on the surface of the drum of the reactor.

The radiation sources can be optionally cooled with gas or water, and, to this end, may be embedded in or may contain a cooling sleeve.

Roll Reactor and Method

The photochemical reactor of the present disclosure, with which the surface treatment method of the present disclosure is carried out, is a roll reactor as schematically depicted in FIG. 1.

The roll reactor comprises a roll 10 having a cross-section which can be round (e.g. circular) shaped and having an outer, circumferential surface. The roll and its outer surface may be made of all sorts of material, e.g. of glass, synthetic materials like Plexiglas™, rubber, plastic or metal. In one embodiment of the disclosure, the surface of the roll can be made of a radiation reflective material, in particular of a UV light reflective material such as polished aluminium and this will enable a double-sided treatment of a particle which will in turn improve the quality of the product and reduce treatment time. Also, using a reflective roll surface will more efficiently use the light energy because the light can be reflected back and forth between the roll surface and a reflector. Alternatively, a roll surface with a matt surface finish can be used to scatter the light and increase the uniformity of particle cross-linking. In another embodiment of the disclosure, the roll surface can be transparent, in particular UV-light transparent and the irradiation source can be arranged inside the roll. At least two irradiation sources can be provided in connection with transparent roll surfaces, at least one irradiation source being arranged inside the transparent roll and at least one irradiation source being arranged outside the roll to provide double-sided particle treatment. Suitable UV-light transparent roll surface material is for example quartz glass. The rolls can be mounted horizontally or vertically to the ground. The vertical, space-saving geometry is enabled by the fact that the presence of water makes the particles stick to each other and to the surface. In this embodiment, the amount of the mixing aid added may be reduced and larger amounts of water are favourable in order to tailor the stickiness of the particles in a way that stick to a higher degree to each other, forming a cohesive layer, and stick to a higher degree to the surface of the roll. Suitable rolls are available e.g. from Winchester Roll Products Inc. Suitable available coaters are e.g. Black Bros. Roll Coaters or slot coaters such as the Speed Coat Slot Applicator of Nordson. The surface of the roll may further exhibit a mesh or a pattern of dots or shallow engraved chambers, as they are used in gravure cylinders, with all those measures aiming at further enhanced mechanical anchoring of the particle layer to the surface of the roll, enabling higher surface speeds, and allowing for higher throughputs of thinner particle layers. The application of thin layers of particles, such as monolayers, is desirable as they can be more easily penetrated by the UV radiation.

Figure 2:
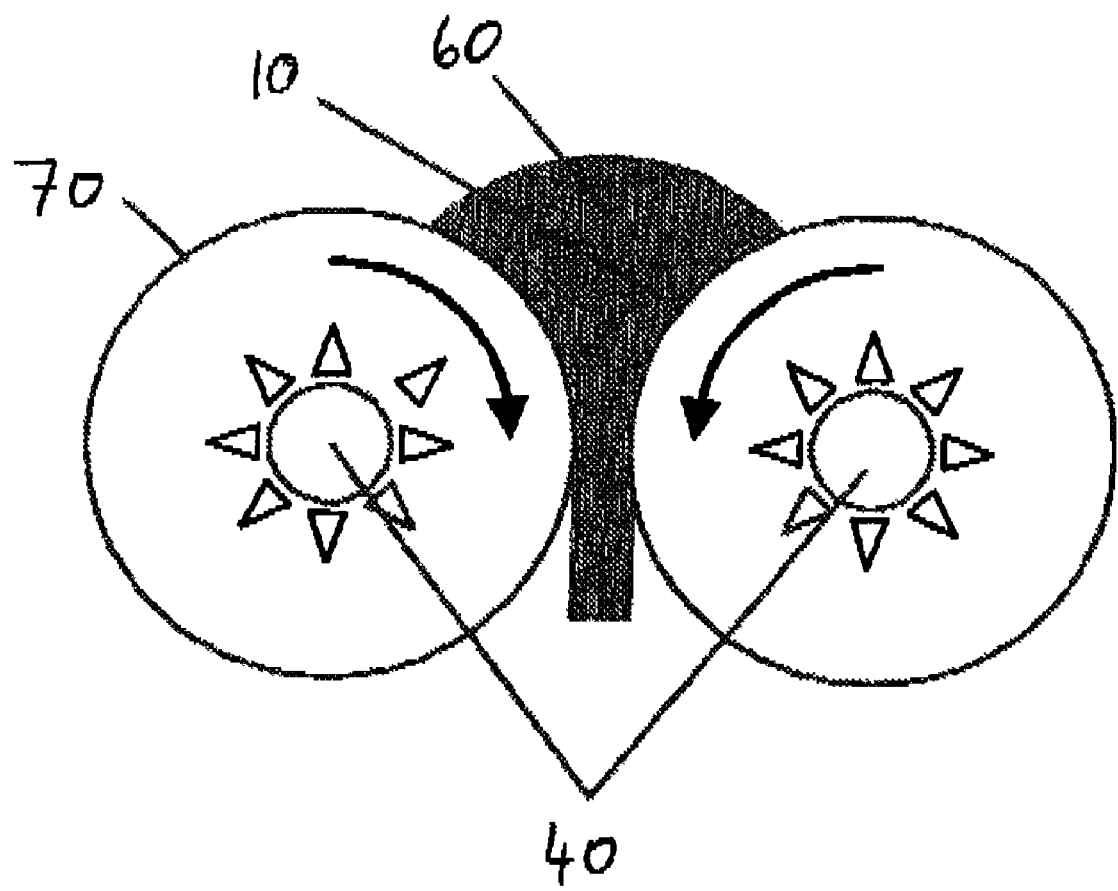
FIG. 2 is a schematic drawing of a roll reactor according to another embodiment of the present disclosure with two transparent rolls and lamps inside the rolls.

FIG. 2 shows another embodiment of the disclosure. Two rolls 10, 70 are provided such that the closest distance of their surfaces forms a gap. Each of the two rolls 10, 70 has a transparent surface and each roll 10, 70 has an irradiation source 40 arranged inside the roll. The rolls can be hollow cylinders with transparent walls encompassing the circumference of the rolls. Reflectors (not shown in FIG. 2) can be mounted behind said irradiation sources in a direction opposite the gap facing side of the irradiation sources. The reflector can be of a light reflective material, such as a parabolic mirror. The reflectors may reflect the radiation onto the particulate material, thereby increasing the radiation efficiency. The roll surfaces are made of material which is transparent to the radiation intended to reach the surface of the particulate material. In case of UV-light, the roll surface can be made for example of quartz glass. Particulate material 60 can be fed into the gap between the roll surfaces. The gap corresponds to the smallest particulate material layer thickness during irradiation and can be adjusted as desired. The gap between the roll surfaces can for example be from 500 µm to 5 mm. This embodiment enables to irradiate the particulate material 60 simultaneously from two sides with significant efficiency gains due to a more uniform radiation of the particle surfaces.

The irradiation source 40 can be mounted such that the radiation emitted by the irradiation source 40 is able to reach at least part of the particulate material 60 that has been fed onto the surface of the roll. The irradiation source 40 can be mounted parallel to the axis around which the roll 10 rotates or slightly tilted to this axis. The irradiation source 40 can irradiate part or the total width of the roll, such as at least 50% of the width, or essentially the complete width of the roll.

Depending on the dimensions of the roll 10 and the intended rotation rate, either one irradiation source or two or more irradiation sources may be required. The irradiation sources 40 can be rod-shaped, bulb-shaped or can be of any other available or known shape. The distance between said irradiation source 40 and the superabsorbent polymer particles being fed onto the surface of said roll can be from 0.1 cm to 15 cm. The distance can be 1 cm or closer so that the intensity arriving at the surface of the particles is increased without contaminating the irradiation source. Also, heat emitted from the irradiation source may be used to further accelerate the cross-linking reaction. The advantageous close distance of the lamp to the particles without contamination of the lamp surface (which would lead to charring due to the typically high temperatures of UV lamp surfaces of typically around 800° C.) is possible in the present disclosure since agitation of the particles is not required. A reflector 50 can be mounted behind said irradiation source. The reflector can be of a light reflective material, such as a parabolic mirror. The reflector 50 may reflect the radiation onto the particulate material, thereby increasing the radiation efficiency.

The radical former molecules and optionally further additives like water or additional cross-linker can be applied to particles, such as superabsorbent polymer particles in a mixing vessel 20. The particles with said radical former molecules added thereon can be fed to the surface of the roll 10 from the pre-treatment mixer 20 or from any kind of storage container with a suitable feeding device, generally known in the art. Suitable feeding methods and devices correspond to those generally used in coating techniques, such as e.g. gap coating, knife-over-roll coating, immersion (dip) coating, reverse-roll coating etc.

In one embodiment, the surface of the roll can be wet. Dry particles will stick on the wetted surface when blown onto the surface using a suitable blowing device for feeding the particles onto the roll. This allows to easily create a monolayer of particles with a simple air-blowing system. Particles that do not stick to the surface can be recycled. Water can be applied to the roll surface and/or to the particles via sprayers before and/or immediately after the particles are fed to the surface of the roll.

The reactor further comprises a collection means 30. The collection means 30 can be provided on the side of the roll 10 opposite to the feeding means and collects the particles after they have undergone surface cross-linking. The collecting means 30 can e.g. be a second roll, a sweeper, a knife, a brush or any other suitable means. The irradiated particles can also be dried on the roll after irradiation by a suitable drying means and then can either fall off the roll surface by gravitational force or can be blown off the roll surface with a suitable blowing device, e.g. an air jet. Suitable available collection means are for example Rotary Brushes of Tanis Inc. or doctor blades of Essco Inc.

According to the method of the present disclosure, the roll 10 is rotated around its rotational axis. Therefore, the roll reactor is provided with a driving means (not shown in FIG. 1) which drives the rotation of the roll 10. The driving means can be any suitable means known in the art, e.g. a motor. The rotation speed can be set such that the irradiation time for the superabsorbent polymer particles is from ⅓ seconds to 2 minutes, or from 1 to 10 seconds. An overall short exposure time helps to reduce detrimental side reactions which may negatively influence the material performance.

The method of the present disclosure can be carried out in a continuous process, i.e. the particles are continuously fed onto the roll and are also continuously collected from the roll after irradiation.

According to the method of the present disclosure, particles are supplied to the roll via the feeding means. As the roll rotates around its axis, the particles pass the irradiation zone and are irradiated with radiation emitted by the irradiation source 40, whereby the photochemical surface reactions can be initiated. After leaving the irradiation zone, the particles leave the surface of the roll and are collected by the collecting means 30.

Particles normally possess a particle size distribution, for example from 10 to 1000 μm. For SAP particles, the layer on the roll can for example be from the average SAP particle size (where the layer on the roll is a monolayer) up to 5 mm, e.g. from 500 μm to 5 mm. However, the number of particle layers on the surface of the roll should be kept rather low to minimize shadowing effects as particles overlaying each other result in the subjacent particle getting less irradiation. For example, a monolayer can be used.

Without wishing to be bound by theory, it is believed that contrary to polymerization reactions, wherein thousands of covalent bonds are created per absorbed photon via chain reaction mechanisms, the crosslinking reaction according to one embodiment of the present disclosure generally requires stoichiometric amounts of photons of UV radiation. Albeit, exposure of the complete surface area of all particles needs to be achieved in order to obtain a uniform cross-linked structure on the surface. An efficient exploitation of the photons is for economic reasons more important, compared to UV initiated polymerization reactions, in order to achieve high mass throughputs with a low number of irradiation sources and low total energy consumption.

Important operational parameters of the roll reactor are the position of the irradiation source 40 relative to the roll 10, the position of the optional reflector 50 relative to the irradiation source 40, the composition of the gas atmosphere around the roll 10, the rotating speed of the roll 10 and the emittance of the radiation source (corresponding to the power of the lamps). A further important parameter is the characteristic of the surface of the roll. Additional heating is typically not required.

The position of the radiation source 40 relative to the roll 10 decides on the distance between the particles and the irradiation source 40. The particles passing the irradiation zone can be distributed evenly over the total width of the roll corresponding to the width of the irradiation zone to ensure uniform irradiation.

For SAP particle crosslinking reactions, the power of the UV lamps strongly depends on the dimensions of the roll reactor and the intended amount of SAP particles passing the irradiation zone at a given time interval. For example, UV lamps having a power density from 50 to 1200 wpi (watts per inch), e.g. 600 wpi may be used. The lamp length can be from 10 to 500 cm, e.g. 200 cm.

The method of the present disclosure can be carried out under normal atmosphere to reduce costs. Also, without wishing to be bound by theory, it is believed that normal atmosphere enables improved surface cross-linking results as oxygen, which is a bi-radical, may participate in the reaction mechanism by formation of intermediate peroxide radicals upon irradiation. Hence, the number of available radicals is proliferated, which in turn enable the formation of carbon-centered radicals in the polymer backbone of the polymer chains in the surface of the SAP particles. The degree of humidity is not crucial for UV irradiation of the present disclosure, as water molecules do not absorb UV-A, -B or -C radiation.

If the method of the present disclosure is not carried out under normal atmosphere, a means for providing and maintaining the desired gaseous environment (e.g. nitrogen or an enhanced water vapour pressure) is provided. It is possible to keep only the roll under the desired atmosphere or, alternatively to keep the complete roll reactor including the irradiation source 40 under the desired atmosphere by placing the reactor or parts of it into a container, which permits to control the gas phase.

The temperature during crosslinking can be from 20° C. to 99° C., or from 20° C. to 75° C., or even from 20° C. to 50° C.

Compared to the equipment required for state of the art surface cross-linking methods, the roll reactor used for the method of the present disclosure weighs less and requires less space. Also, the equipment is less expensive.

The roll reactor of the present disclosure ensures less abrasion compared to other irradiation methods comprising rather vigorous agitation of the particles during irradiation.

The different relevant parameters described above are often connected to each other such that varying one parameter may require that at least one other parameter also has to be changed and adjusted. E.g. the power of the UV lamps will have an influence on the overall number of UV lamps required for the method. Further, the dimension and overall number of the UV lamps may have an influence on the diameter and width of the roll. The dimensions of the roll in turn, may influence the rotation speed, as diameter of the roll, rotation speed and dimension of the irradiation zone all influence the residence time of the SAP particles within the irradiation zone. Hence, to achieve a desired change in the method, it may be possible to alternatively change one parameter or the other, or to change more than one parameter. However, by routinely adjusting the different parameters, the method of the present disclosure can be readily and relatively quickly optimized until the SAP particles obtained by the method of the present disclosure have the desired degree of surface cross-linking.

Absorbent Articles

The SAP particles made according to one embodiment of the method of the present disclosure can be applied in absorbent cores of absorbent articles. As used herein, absorbent article refers to devices that absorb and contain liquid, and more specifically, refers to devices that are placed against or in proximity to the body of the wearer to absorb and contain the various exudates discharged from the body. Absorbent articles include but are not limited to diapers, adult incontinent briefs, diaper holders and liners, sanitary napkins and the like.

Absorbent articles of the present disclosure include diapers. As used herein, "diaper" refers to an absorbent article generally worn by infants and incontinent persons about the lower torso.

Absorbent articles especially suitable for the present disclosure typically comprise an outer covering including a liquid pervious topsheet, a liquid impervious backsheet and an absorbent core generally disposed between the topsheet and the backsheet. The absorbent core may comprise any absorbent material that is generally compressible, conformable, non-irritating to the wearer's skin, and capable of absorbing and retaining liquids such as urine and other certain body exudates. In addition to the SAP particles of the present disclosure, the absorbent core may comprise a wide variety of liquid-absorbent materials commonly used in disposable diapers and other absorbent articles such as comminuted wood pulp, which is generally referred to as air felt.

Exemplary absorbent structures for use as the absorbent assemblies are described in U.S. Pat. No. 5,137,537 entitled "Absorbent Structure Containing Individualized, Polycarboxylic Acid Crosslinked Wood Pulp Cellulose Fibers" which issued to Herron et al. on Aug. 11, 1992; U.S. Pat. No. 5,147,345 entitled "High Efficiency Absorbent Articles For Incontinence Management" issued to Young et al. on Sep. 15, 1992; U.S. Pat. No. 5,342,338 entitled "Disposable Absorbent Article For Low-Viscosity Fecal Material" issued to Roe on Aug. 30, 1994; U.S. Pat. No. 5,260,345 entitled "Absorbent Foam Materials For Aqueous Body Fluids and Absorbent Articles Containing Such Materials" issued to DesMarais et al. on Nov. 9, 1993; U.S. Pat. No. 5,387,207 entitled "Thin-Until-Wet Absorbent Foam Materials For Aqueous Body Fluids And Process For Making Same" issued to Dyer et al. on Feb. 7, 1995; U.S. Pat. No. 5,397,316 entitled "Slitted Absorbent Members for Aqueous Body Fluids Formed of Expandable Absorbent Materials" issued to LaVon et al. on Mar. 14, 1995; and U.S. Pat. No. 5,650,222 entitled "Absorbent Foam Materials for Aqueous Fluids Made From High Internal Phase Emulsions Having Very High Water-to-oil Ratios" issued to DesMarrais et al. on Jul. 22, 1997.

The present disclosure also relates to a method of making an absorbent article comprising (i) providing surface treated superabsorbent polymer particles made according to the method as described above and (ii) incorporating said surface treated superabsorbent polymer particles as at least part of the absorbent material of said absorbent article. The surface treated superabsorbent polymer particles can be comprised in the absorbent core of the absorbent article.

The benefits of the method of the disclosure and of surface treated particles produced therewith, are at least one of the following. Unlike methods using mixing or agitating reactors, all particles experience the same exposure time and particles are not "overcooked" once initiator is used up. Stoichiometry of initiator and photons can easily be adjusted to each other without losses of other one. Unlike methods using transportation means such as conveyor belts, it is easier to recycle left-over particles with a sweeper. Perforated rolls give the opportunity to apply vacuum inside to better hold the particles on the surface which enables even faster speed. Also, vacuum is one possibility to remove excess free water. A precise temperature control can be achieved by keeping the drum at a particular temperature. The substantial mass of the drum envelope will ensure uniformity and stability of the temperature field. Alternatively, the surface of the drum can remove excess heat by cooling. Rolls are advantageous to other transportation means such as conveyor belts in that they are more durable and can serve for a much longer time without replacement. Also, rolls can be run faster than conveyor belts because there is no slippage associated with the interaction between the belt and the rolls which move it. Additionally, at the same linear speed the rotational speed of the roll is much lower than that of conveyor belt rolls due to much larger diameter. This leads to better process reliability and lower maintenance cost. Saturated steam can be fed through openings in the roll envelope to avoid premature drying of the particles. The roll system can be turned 90 degrees such that the axis of the roll's rotation becomes vertical to the ground. This will further reduce the dimensions of the system and simplify maintenance operations. More lamps can be arranged around the drum than along a conveyor of the same length as the circumference of the drum because radial placement allows for more room for wiring and connections further away from the center of the drum.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of surface treating particulate materials, the method comprising:
    providing a particulate material;
    providing a roll with an outer surface and a roll width;
    providing an irradiation source configured to emit electromagnetic radiation;
    feeding the particulate material onto the outer surface of the roll;
    rotating the roll;
    irradiating at least part of the particulate material with electromagnetic radiation from the irradiation source, while rotating the roll; and
    collecting the particulate material after the irradiating.

2. The method of claim 1, including cross-linking the particulate material.

3. The method of claim 1, wherein the irradiating includes irradiating at least part of the particulate material with electromagnetic radiation that is UV radiation of a wavelength between about 201 nm and 400 nm.

4. The method of claim 3, including providing radical former molecules and applying the radical former molecules onto the superabsorbent polymer particles.

5. The method of claim 3, including applying additional surface cross-linking molecules onto the superabsorbent polymer particles prior to the irradiating, wherein the additional surface cross-linking molecules have at least two functional groups, selected from groups including C=C double bonds and CH—X moieties with X being a hetero atom.

6. The method of claim 3 wherein providing the particulate material includes providing superabsorbent polymer particles containing between about 8% and 40% water by weight.

7. The method of claim 1, wherein providing the particulate material includes providing superabsorbent polymer particles.

8. The method of claim 7, including functionalizing the superabsorbent polymer particles.

9. The method of claim 7, wherein providing the radical former molecules includes applying water-soluble radical former molecules in an aqueous solution.

10. The method of claim 1, wherein providing the irradiation source includes providing the irradiation source across substantially all of the roll width.

11. The method of claim 1, wherein providing the irradiation source includes providing the irradiation source at a distance from the outer surface between about 1 cm and about 15 cm.

12. The method of claim 1 including providing a reflector behind the irradiation source.

13. The method according to claim 1, wherein the rotating includes rotating the roll at a speed between about 1 rpm and about 180 rpm.

14. The method of claim 13, wherein providing the radical former molecules includes providing radical former molecules selected from the group consisting of sodium peroxodisulfate, ammonium peroxodisulfate and mixtures thereof.

15. The method of claim 1 wherein the irradiating includes irradiating at a temperature between about 20° C. and about 99° C.

16. The method of claim 1 wherein the feeding and the collecting are both continuous.

17. The method of claim 1 wherein the feeding includes feeding the particulate material onto the outer surface of the roll with a thickness between about 500 μm and about 5 mm.

18. The method of claim 1 wherein the irradiating includes irradiating at least part of the particulate material with electromagnetic radiation from for a time between about one third of a second to about 2 minutes.

19. The method of claim 1:
wherein providing the roll includes providing a roll with a transparent outer surface;
wherein providing an irradiation source includes providing a first irradiation source positioned inside of the transparent outer surface; and
including providing a second irradiation source positioned outside of the transparent outer surface.

\* \* \* \* \*